United States Patent
Mohri et al.

[11] Patent Number: 6,134,058
[45] Date of Patent: Oct. 17, 2000

[54] OBJECT LENS DRIVING DEVICE

[75] Inventors: Masanari Mohri, Hyogo; Hitoshi Fujii, Osaka; Kanji Wakabayashi; Hiroshi Yamamoto, both of Kyoto; Teruyuki Takizawa; Takeo Santo, both of Osaka, all of Japan

[73] Assignee: Matsushita Electric Industrial Co., Ltd., Osaka, Japan

[21] Appl. No.: 09/342,585

[22] Filed: Jun. 29, 1999

[30] Foreign Application Priority Data

Jul. 3, 1998 [JP] Japan .................................. 10-188650
Oct. 20, 1998 [JP] Japan .................................. 10-298051

[51] Int. Cl.[7] .............................. G02B 7/02; G11B 7/00
[52] U.S. Cl. ...................... 359/824; 359/813; 359/814; 369/44.15
[58] Field of Search .................................. 359/811, 813, 359/814, 819, 823, 824; 369/44.15, 44.16

[56] References Cited

U.S. PATENT DOCUMENTS

| | | | |
|---|---|---|---|
| 4,773,055 | 9/1988 | Gijzen et al. | 369/44.16 |
| 5,446,721 | 8/1995 | Sekimoto et al. | 369/247 |
| 5,905,255 | 5/1999 | Wakabayashi et al. | 250/201.5 |
| 6,016,292 | 1/2000 | Lee | 369/44.15 |

FOREIGN PATENT DOCUMENTS

| | | |
|---|---|---|
| 58-88841 | 5/1983 | Japan . |
| 60-142822 | 9/1985 | Japan . |
| 61-187134 | 8/1986 | Japan . |
| 62-33345 | 2/1987 | Japan . |
| 62-33346 | 2/1987 | Japan . |
| 62-119742 | 6/1987 | Japan . |
| 64-82341 | 3/1989 | Japan . |
| 2-23536 | 1/1990 | Japan . |
| 4-103042 | 4/1992 | Japan . |
| 4-366429 | 12/1992 | Japan . |
| 5-10249 | 3/1993 | Japan . |
| 5-16647 | 5/1993 | Japan . |
| 6-68844 | 8/1994 | Japan . |
| 9-22537 | 1/1997 | Japan . |

*Primary Examiner*—Georgia Epps
*Assistant Examiner*—Saud Seyrafi
*Attorney, Agent, or Firm*—Ratner & Prestia

[57] ABSTRACT

An object lens driving device of the present invention includes a movable section, supporting sections for supporting the movable section and a base for holding the supporting sections. The movable section includes an object lens for recording and/or reproducing optical information to and/or from a disk-shaped recording medium, a lens holder for holding the object lens and at least four permanent magnets adhered to the lens holder. The supporting sections include at least four metal wires substantially parallel to each other, each wire having a first end fixed to the lens holder and a second end connected to the base, and elastic deformable elements connected to the base and having connecting sections thereof connected to the second end of each respective metal wire. The base includes yokes fixed to the base and facing the respective permanent magnets, focusing coils wound around the respective yokes, wound axes of the focusing coils being oriented in a direction of an optical axis of the object lens, and tracking coils wound around the respective yokes, wound axes of the tracking coils being oriented in a direction perpendicular to the wound axes of the focusing coils.

15 Claims, 17 Drawing Sheets

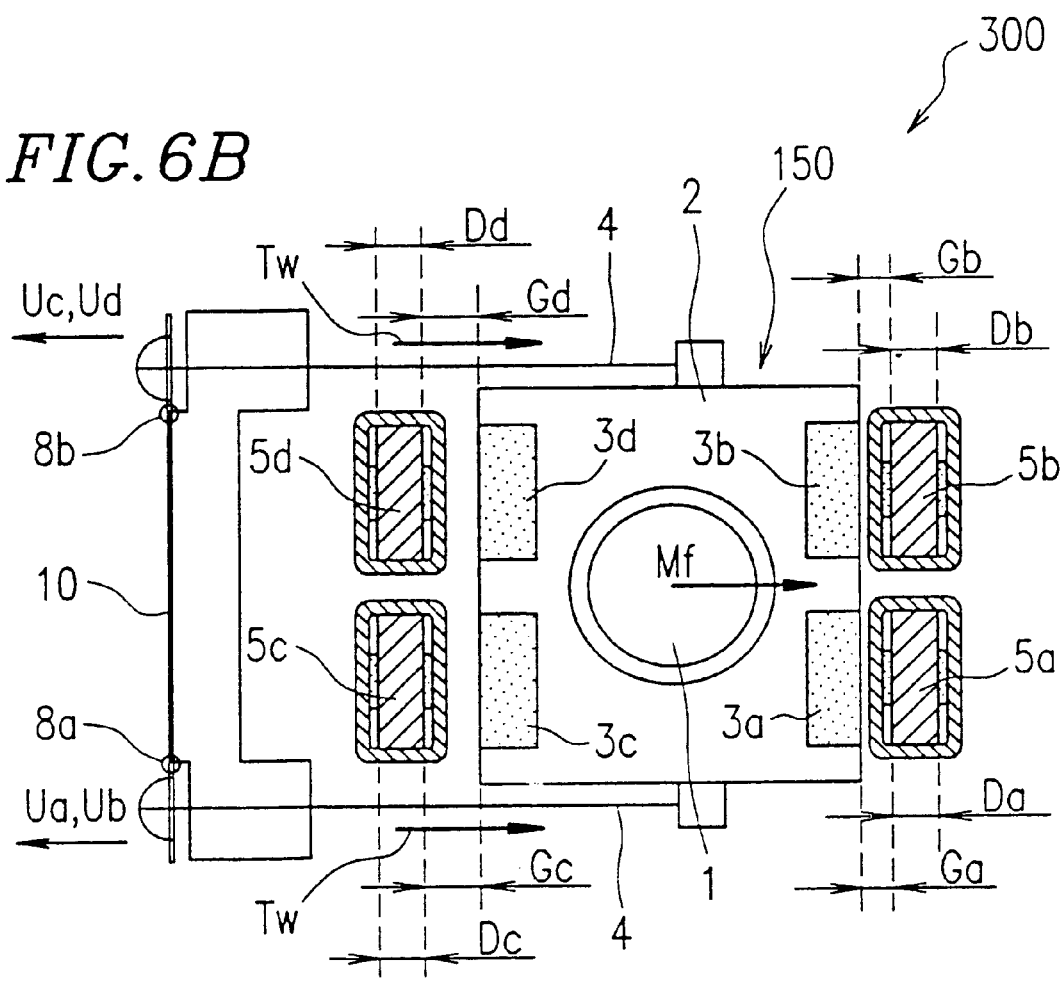

OBJECT LENS DRIVING DEVICE

BACKGROUND OF THE INVENTION

1. Field of the Invention

The present invention relates to an object lens driving device used in an optical information recording and/or reproduction apparatus for recording information to and/or reproducing information from a disk-shaped recording medium.

2. Description of the Related Art

If a disk-shaped recording medium (hereinafter, simply referred to as "disk") is warped, the distance between the surface of the recording medium and an object lens of the object lens driving device varies as the recording medium rotates, resulting in a focusing error. If the rotation of the recording medium is off-center, a tracking error occurs. In order to prevent a focusing or tracking error, an object lens driving device controls the object lens to be driven in two directions, namely, along the optical axis of the object lens which is vertical to the surface of the recording medium (focusing direction) and along the direction parallel to the surface of the recording medium (tracking direction).

In the optical information recording and/or reproduction apparatus incorporating the object lens driving device as described above, a relative tilt of the optical axis of the object lens to the surface of a disk (hereinafter, simply referred to as "tilt") may occur besides the focusing error and the tracking error. The tilt is responsible for optical aberration which deteriorates signals during recording and reproduction.

Some conventional optical information recording and/or reproduction apparatus have been proposed for solving the above problems. For example, Japanese Laid-Open Publication No. 9-22537 discloses that the tilt is corrected by providing at least one permanent magnet adhered to a movable section and at least two focusing coils attached on a base and regulating currents flowing through the coils.

Such a conventional optical information recording and/or reproduction apparatus will be described below with reference to the accompanying drawings. FIG. 11 is a perspective view of a structure of the conventional optical information recording and/or reproduction apparatus 500. FIG. 12 is a diagram for explaining the definitions of the reference symbols of the present specification.

Referring to FIG. 11, the apparatus 500 includes an object lens 101, a lens holder 102 for holding the object lens 101, permanent magnets 103a and 103b adhered to the lens holder 102, suspension wires 104, opposed yokes 105a–105d, tracking coils 106a–106d, focusing coils 107a–107d, a suspension holder 108, and a fixation base 109. The object lens 101, the lens holder 102, and the permanent magnets 103a and 103b constitute a movable section 550. A first end of each suspension wire 104 is attached to the movable section 550 while one end of each suspension wire 104 is attached to the suspension holder 108.

Referring to FIG. 12, moving directions of the movable section 550 are defined. In FIG. 12, Fo indicates a focusing direction parallel to an optical axis; Tr a tracking direction perpendicular to the direction Fo; Rt a radial tilt which is a tilt around the axis of a tangential direction; and Tt a tangential tilt which is a tilt around the axis of the tracking direction.

Now the operation of the conventional object lens driving apparatus 500 will be described with reference to FIG. 11.

The movable section 550 is driven toward the tracking direction Tr by electromagnetic forces generated by electric currents through the tracking coils 106a–106d traversing in a direction perpendicular to the magnetic flux of the permanent magnets 103a and 103b. Since the tracking coils 106a–106d are fixed on the base 109, the movable section 550 performs its relative substantially translational movement.

The movable section 550 is also driven toward the focusing direction Fo by electromagnetic forces generated by electric currents through the focusing coils 107a–107d traversing in a direction perpendicular to the magnetic flux of the permanent magnets 103a and 103b, performing its substantially translational movement.

Furthermore, the movable section 550 is driven along the direction of the radial tilt Rt by the moment Mr of a force around the Y axis produced by applying to the movable section 550 a driving force in the direction Fo by the focusing coils 107a and 107c and a driving force in the direction Fo, but in the opposite direction, by the focusing coils 107b and 107d. According to this, it is possible to correct the radial tilt.

To enhance the recording capacity of an optical information recording and/or reproduction apparatus using disks, a condensed light spot used for recording and reproducing information to and from the disk has been increasingly made narrower by adopting an object lens having a higher aperture ratio. In this case, the optical aberration caused by the relative tilt of the optical axis of the object lens to the surface of the disk increases in proportion to the third power of the aperture ratio. To obtain satisfactory recording and reproduction signals, it is therefore required to correct the tilt of the optical axis of the object lens to the disk.

Although the above-described structure makes it possible to correct a tilt in a radial direction caused by the warp of a disk and the like, so-called radial tilt, it is difficult to correct a tilt in a tangential direction caused by the bend of a disk, so-called tangential tilt.

The present invention is provided to solve the above problems with the conventional object lens driving device.

SUMMARY OF THE INVENTION

According to one aspect of the present invention, an object lens driving device includes a movable section, supporting sections for supporting the movable section and a base for holding the supporting sections. The movable section includes an object lens for recording and/or reproducing optical information to and/or from a disk-shaped recording medium, a lens holder for holding the object lens and at least four permanent magnets adhered to the lens holder. The supporting sections include at least four metal wires substantially parallel to each other, each wire having a first end fixed to the lens holder and a second end connected to the base, and elastic deformable elements connected to the base and having connecting sections thereof connected to the second end of each respective metal wire. The base includes yokes fixed to the base and facing the respective permanent magnets, focusing coils wound around the respective yokes, wound axes of the focusing coils being oriented in a direction of an optical axis of the object lens, and tracking coils wound around the respective yokes, wound axes of the tracking coils being oriented in a direction perpendicular to the wound axes of the focusing coils.

In one embodiment of the present invention, the object lens driving further includes a control section for applying electric currents to the respective focusing coils, in which the control section switches directions of the electric currents to drive the lens holder in a focusing direction, a radial tilt direction and a tangential tilt direction.

In another embodiment of the present invention, the elastic deformable elements are board-shaped or rod-shaped and the connecting sections are elastic-deformable so that the second end of each respective metal wire can displace along an axial direction of the metal wire.

In still another embodiment of the present invention, the yokes are provided to face the respective permanent magnets along the axial direction of the metal wire. The yokes and the permanent magnets are provided so that forces of tension act on the metal wires. The forces of tension are generated by the addition of magnetic forces of attraction between the yokes and the permanent magnets.

In still another embodiment of the present invention, distances between the yokes and the permanent magnets are provided so that forces of tension act on the metal wires.

In still another embodiment of the present invention, thicknesses of the yokes along the axial direction of the metal wire are provided so that forces of tension act on the metal wires.

In still another embodiment of the present invention, spring forces necessary for the connecting sections to deform along axial directions of the respective metal wires are greater than at least the respective magnetic forces of attraction.

In still another embodiment of the present invention, the lens holder includes relaying elements, the first end of the metal wire being connected to each relaying element, a main body of the lens holder for holding the object lens and elastic deformable elements for interconnecting the main body of the lens holder and the relaying elements, deforming so that the main body of the lens holder pivots in a tangential tilt direction.

According to another aspect of the present invention, an object lens driving device includes a movable section, supporting sections for supporting the movable section and a base for holding the supporting sections. The movable section includes an object lens for recording and/or reproducing optical information to and/or from a disk-shaped recording medium, a lens holder for holding the object lens and at least two permanent magnets adhered to the lens holder. The supporting sections include at least four metal wires substantially parallel to each other, each wire having a first end fixed to the lens holder and a second end connected to the base. The base includes yokes fixed to the base and facing the respective permanent magnets, focusing coils wound around the respective yokes, wound axes of the focusing coils being oriented in a direction of an optical axis of the object lens, and tracking coils wound around the respective yokes, wound axes of the tracking coils being oriented in a direction perpendicular to the wound axes of the focusing coils. The lens holder includes relaying elements, the first end of the metal wire being connected to each relaying element, a main body of the lens holder for holding the object lens and elastic deformable elements for interconnecting the main body of the lens holder and the relaying elements, deforming so that the main body of the lens holder pivots in a tangential tilt direction.

In one embodiment of the present invention, the elastic deformable element includes a flat spring that has a pivotal axis and deforms by twisting around the pivotal axis so that the main body of the lens holder pivots in a tangential tilt direction, the flat spring having L-shaped or +-shaped cross-section thereof.

In another embodiment of the present invention, the elastic deformable element is hinge-shaped.

In still another embodiment of the present invention, the elastic deformable element has a pivotal axis and deforms by twisting around the pivotal axis so that the main body of the lens holder pivots in a tangential tilt direction. The elastic deformable element is provided so that the pivotal axis passes through a center of mass of the movable section.

In still another embodiment of the present invention, the elastic deformable element has a pivotal axis and deforms by twisting around a pivotal axis so that the main body of the lens holder pivots in a tangential tilt direction. The elastic deformable element is provided so that the pivotal axis passes through a principal point of the object lens.

In still another embodiment of the present invention, the elastic deformable element includes a flat spring that has a pivotal axis and deforms by twisting around the pivotal axis so that the main body of the lens holder pivots in a tangential tilt direction, and the flat spring is covered with a damping material.

In still another embodiment of the present invention, a returning force generated by a pivotal movement of the elastic deformable element is greater than at least a magnetic force of attraction around the pivotal axis generated between the yoke and the permanent magnet.

Thus, the invention described herein makes possible the advantages of (1) providing an object lens driving device which can correct positions of a movable section with respect to a disk in a tangential tilt direction, as well as a focusing direction, a tracking direction and a radial tilt direction; and (2) providing an object lens driving device which has optimal drive characteristics by providing design freedom of a spring constant defining sensitivity in a low-frequency region (first-order resonant frequency region) for tangential tilt correction.

These and other advantages of the present invention will become apparent to those skilled in the art upon reading and understanding the following detailed description with reference to the accompanying figures.

BRIEF DESCRIPTION OF THE DRAWINGS

FIG. 6B is a schematic diagram illustrating a structure of an object lens driving device according to Example 3 of the present invention.

DESCRIPTION OF THE PREFERRED EMBODIMENTS

Examples of the present invention will be described below with reference to the accompanying drawings.

EXAMPLE 1

Figure 1A:
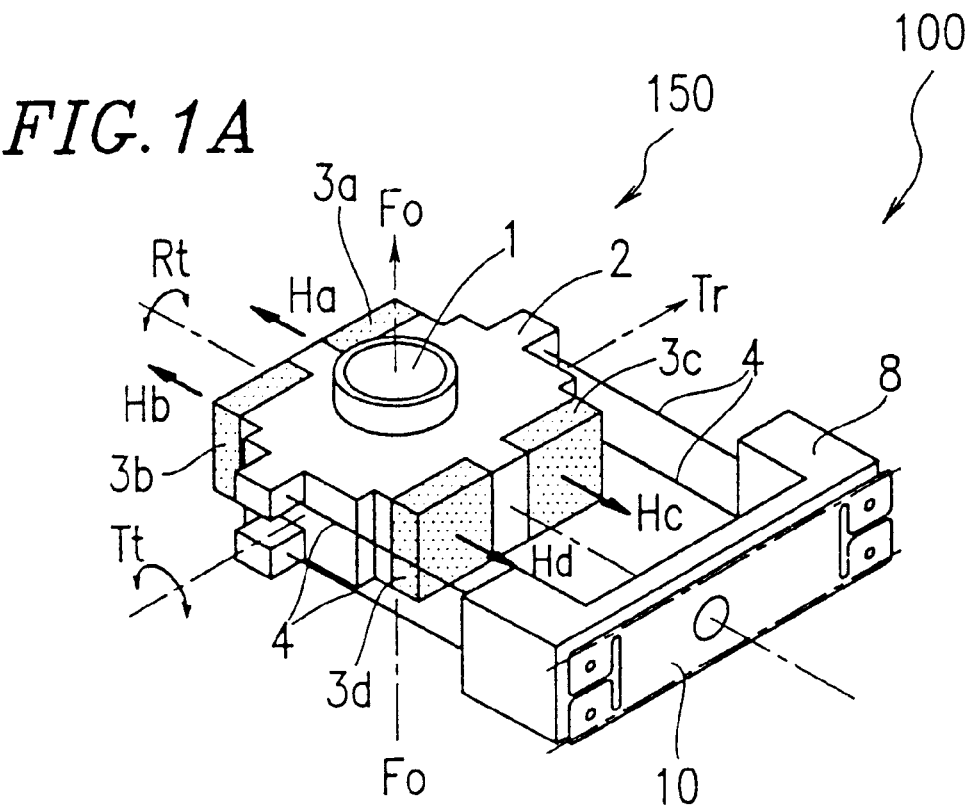
FIG. 1A is a perspective view illustrating a portion of a structure of an object lens driving device according to Example 1 of the present invention.
Figure 1B:
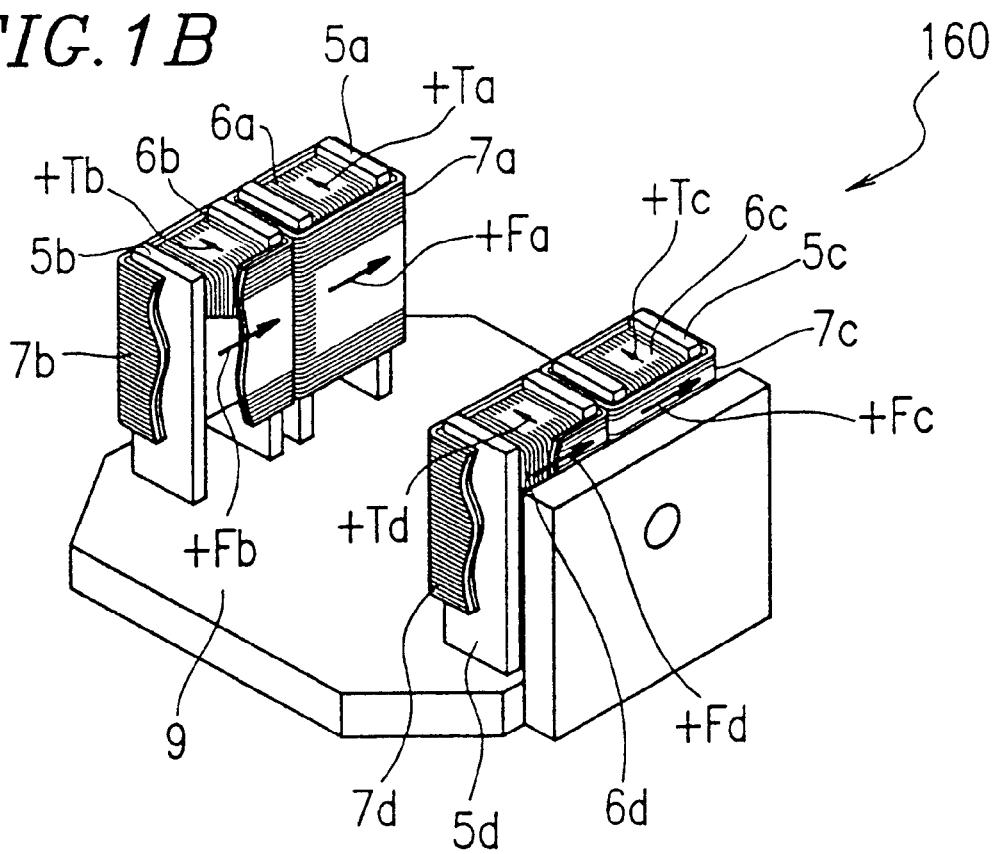
FIG. 1B is a perspective view illustrating another portion of a structure of an object lens driving device according to Example 1 of the present invention.

FIGS. 1A and 1B are perspective views of an object lens driving device 100 according to Example 1 of the present invention. FIGS. 2A–2D are schematic diagrams illustrating radial tilt movements of a movable section. FIGS. 3A–3D are schematic diagrams illustrating tangential tilt movements of the movable section.

Referring to FIGS. 1A and 1B, the device 100 includes an object lens 1, a lens holder 2 for holding the object lens 1, permanent magnets 3a–3d adhered to the lens holder 2, suspension wires 4, opposed yokes 5a–5d, tracking coils 6a–6d, focusing coils 7a–7d, a suspension holder 8, a fixation base 9, and a tilt spring 10. Reference symbols Ha–Hd indicate directions of magnetization of the permanent magnets 3a–3d; Tr a tracking direction; Fo a focusing direction; Rt a radial tilt direction: Tt a tangential tilt direction; ±Fa–±Fd directions of electric current through the focusing coils 7a–7d, respectively; and ±Ta–±Td directions of electric currents through the tracking coils 6a–6d, respectively. Note that the above directions of electric currents having negative signs are not shown. The Tr to Tt directions have been previously defined with reference to FIG. 12.

The object lens 1, the lens holder 2, and the permanent magnets 3a–3d constitute a movable section 150. A first end of each suspension wire 4 is attached to the movable section 150 while a second end of each suspension wire 4 is attached to the tilt spring 10. The tilt spring 10 is further fixed to the fixation base 9 via the suspension holder 8. The movable section 150 is driven by electromagnetic forces generated by interaction of magnetic fields of the permanent magnets 3a–3d adhered thereto and electric currents past through the tracking coils 6a–6d and the focusing coils 7a–7d made by winding wire around the yokes 5a–5d fixed to the fixation base 9.

Next, the movement and driving of the movable section 150 will be described with reference to FIGS. 1A and 1B. As shown in FIGS. 1A and 1B, the movable section 150 is supported by the four suspension wires 4 so that it can perform translational movements in the Fo and Tr directions. Each direction is defined in FIG. 12.

The force of driving the movable section 150 toward the focusing direction +Fo is generated by electric currents flowing through the focusing coils 7a–7d toward the directions +Fa, +Fb, +Fc and +Fd, respectively. Then, the movable section 150 translationally moves toward the focusing direction +Fo. The force of driving the movable section 150 toward the tracking direction +Tr is generated by electric currents flowing through the focusing coils 6a–6d toward the directions +Ta, +Tb, +Tc and +Td, respectively. Then, the movable section 150 translationally moves toward the direction +Tr.

Figure 2A:
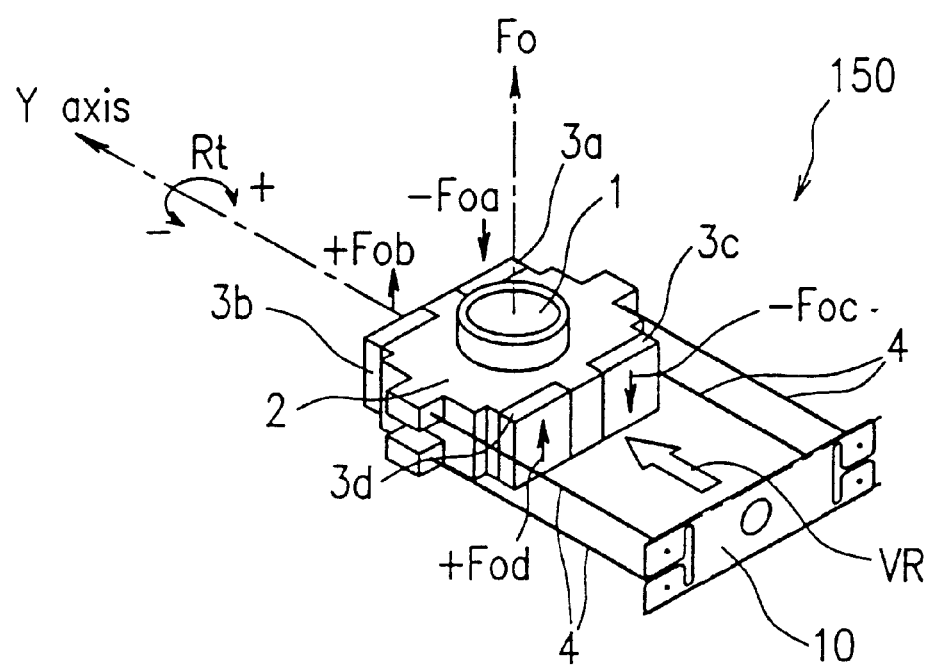
FIG. 2A is a schematic diagram illustrating a radial tilt movement in Example 1 of the present invention.
Figure 2B:
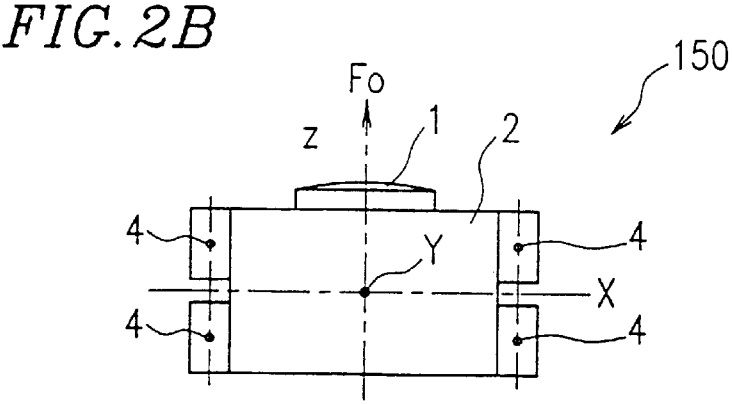
FIG. 2B is a side view illustrating a radial tilt movement in Example 1 of the present invention.
Figure 2C:
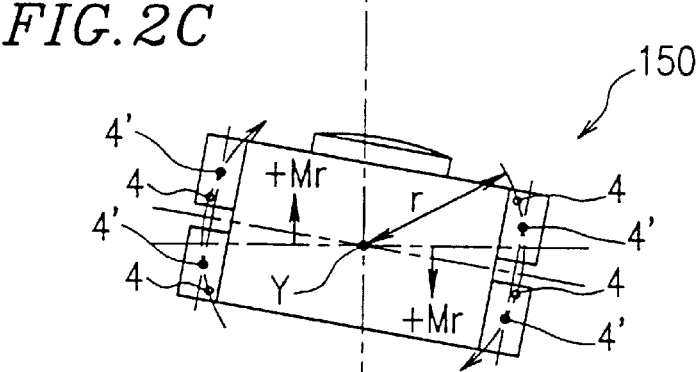
FIG. 2C is a side view illustrating a radial tilt movement in a direction +Rt in Example 1 of the present invention.
Figure 2D:
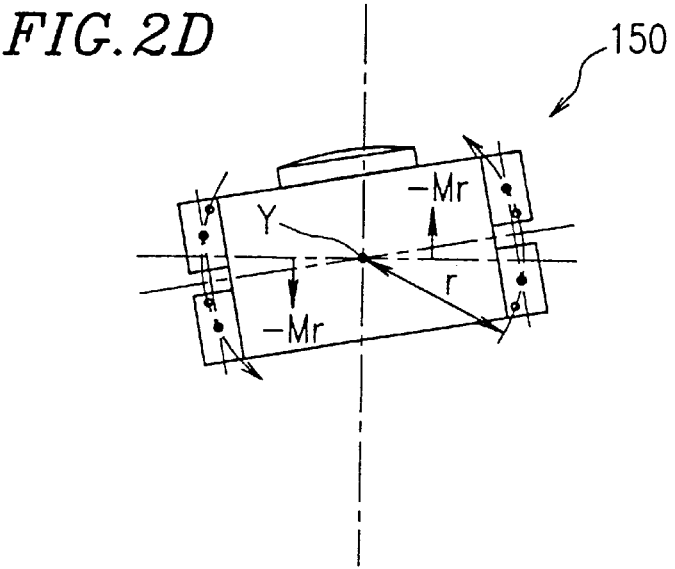
FIG. 2D is a side view illustrating a radial tilt movement in a direction −Rt in Example 1 of the present invention.

Next, the driving and supporting of the movable section 150 in the radial tilt direction Rt will be described with reference to FIGS. 2A–2D. FIG. 2A is a partial perspective view illustrating the movable section 150, the suspension wires 4 and the tilt spring 10. FIGS. 2B–2D are side views of the movable section 150 as seen in the direction of an arrow VR of FIG. 2A.

Figure 12:
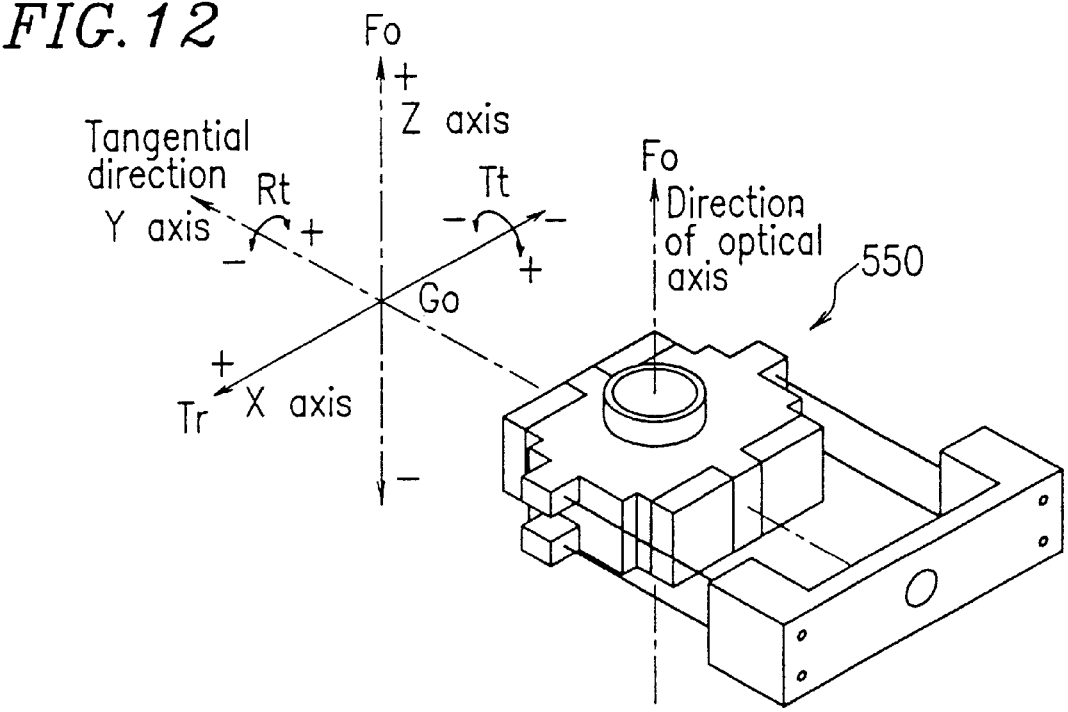
FIG. 12 is a diagram for explaining definitions of reference symbols in the present specification.

In FIGS. 2A–2D, reference symbol Y indicates the Y axis defined in FIG. 12; r indicates the distance between the Y axis and the center of the suspension wire 4; ±Mr the moment of a force around the Y axis acting on the movable section 150; 4' positions of the suspension wires 4 after they have been driven toward the radial tilt direction Rt; and ±Foa–Fod driving forces acting on the movable section 150.

In FIG. 2A, the driving forces −Foa, +Fob, −Foc and +Fod are produced by electric currents flowing through the focusing coils 7a–7d of FIGS. 1A and 1B in the directions −Fa, +Fb, −Fc and +Fd, respectively. Movements of the movable section 150 in the radial tilt direction when the driving forces −Foa, +Fob, −Foc and +Fod act on the movable section 150 will be described with reference to FIGS. 2B–2D. FIG. 2B illustrates a state (initial state) of the movable section 150 when no driving force acts thereon. FIGS. 2C and 2D illustrate states of the movable section 150 with radial tilts Rt.

As shown in FIG. 2C, the addition of the driving forces −Foa, +Fob, −Foc and +Fod acts on the movable section 150 as the moment of the force +Mr around the Y axis. The moment of the force +Mr makes each suspension wire 4 twisted in such a way that the end of the suspension wire 4 attached to the movable section 150 follows along a circle with the radius r.

FIG. 2D illustrates the movable section 150 driven by the moment of the force −Mr in a direction opposite to the moment of the force +Mr of FIG. 2C. The moment of the force −Mr is produced by electric currents flowing through the focusing coils 7a–7d in the opposite directions to those in the case of FIG. 2C.

As described above, the movable section 150 is supported by the deformable suspension wires 4 so that the movable section 150 can be driven in the radial direction Rt by controlling the directions of flow of electric currents through the focusing coils 7a–7d.

Figure 3A:
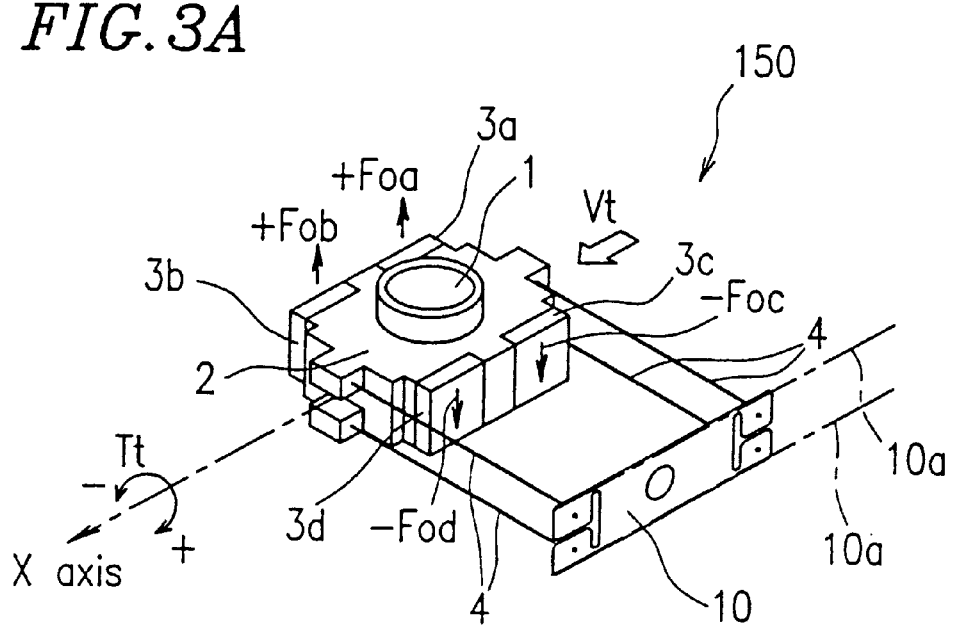
FIG. 3A is a schematic diagram illustrating a tangential tilt movement in Example 1 of the present invention.
Figure 3B:
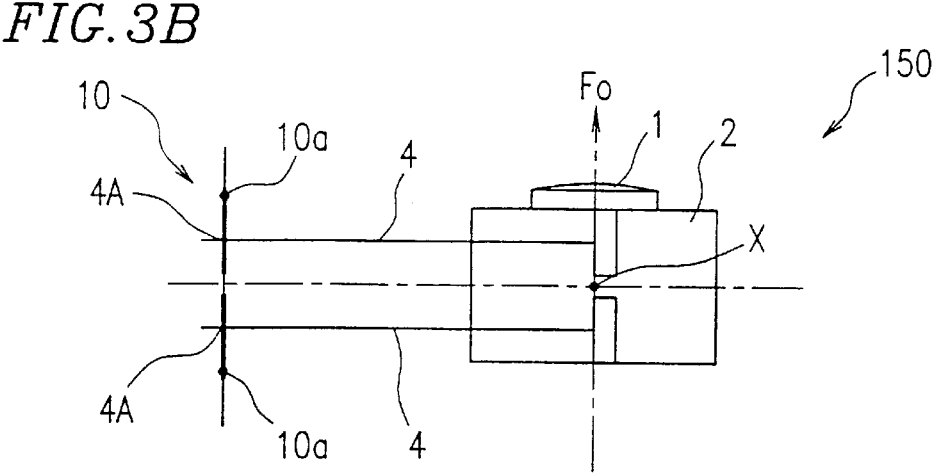
FIG. 3B is a side view illustrating a tangential tilt movement in Example 1 of the present invention.
Figure 3C:
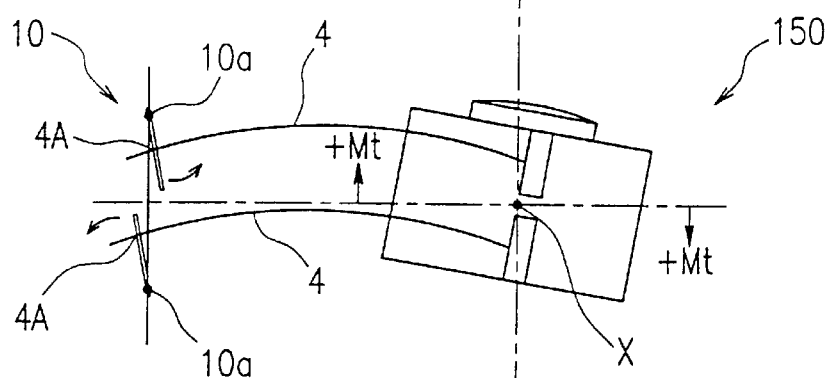
FIG. 3C is a side view illustrating a tangential tilt movement in a direction +Tt in Example 1 of the present invention.
Figure 3D:
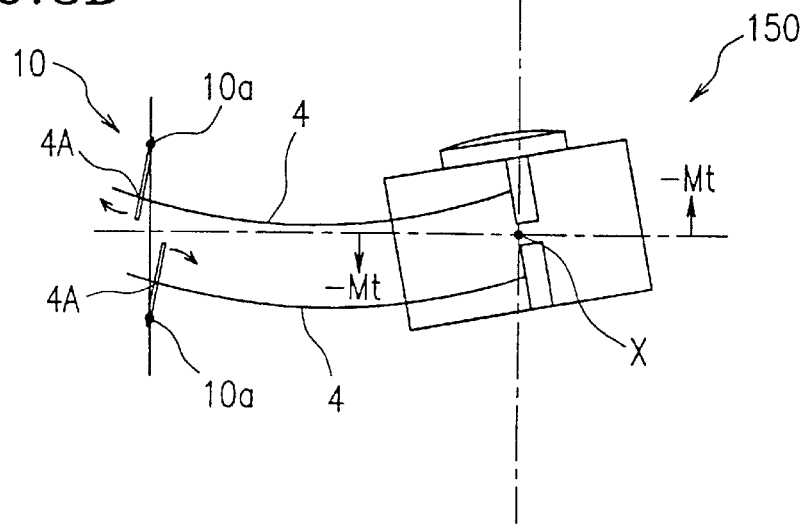
FIG. 3D is a side view illustrating a tangential tilt movement in a direction −Tt in Example 1 of the present invention.

Next, the driving and supporting of the movable direction 150 in the tangential tilt direction Tt will be described with reference to FIGS. 3A–3D. FIG. 3A is a partial perspective view illustrating the movable section 150, the suspension wires 4 and the tilt spring 10. FIGS. 3B–3D are side views of the movable section 150 as seen in the direction of an arrow Vt of FIG. 3A.

In FIGS. 3A–3D, reference numeral 10a indicates pivotal axes of the deformable tilt spring 10; 4A fixation sections of the suspension wires 4 at which a second end of each suspension wire 4 is fixed to the tilt spring 10; X the X axis defined in FIG. 6; ±Mt the moment of a force around the X axis acting on the movable section 150; and ±Foa–±Fod driving forces acting on the movable section 150.

In FIG. 3A, the driving forces +Foa, +Fob, −Foc and −Fod are produced by electric currents flowing through the focusing coils 7a–7d of FIGS. 1A and 1B in the directions +Fa, +Fb, −Fc and −Fd, respectively. Movements of the movable section 150 in the tangential tilt direction when the driving forces +Foa, +Fob, −Foc and −Fod act on the movable section 150 will be described with reference to FIGS. 3B–3D.

FIG. 3B illustrates a state (initial state) of the movable section 150 when no driving force acts thereon. FIGS. 3C and 3D illustrate states of the movable section 150 with the tangential tilts Tt. As described in FIG. 3C, the addition of the driving forces +Foa, +Fob, −Foc and −Fod acts on the movable section 150 as the moment of the force +Mt around the X axis. The moment of the force +Mt acts on each suspension wire 4 as a buckling force of tension and compression. As shown in FIGS. 3C and 3D, the tilt spring 10 Is deformed around the pivotal axes 10a.

The fixation section 4A of the suspension wire 4 is displaced in the tension or compression direction by the deformation of the tilt spring 10. Thus, the movable section 150 can move along the tangential tilt direction Tt in proportion to the amount of the displacement of the fixation section 4A.

As described above, according to Example 1, the driving means are deployed at the four positions and the tilt spring 10 supports the fixation sections 4A of the suspension wires 4 to be displaceable in the tension and compression directions, whereby the movable section 150 can be driven and supported in such a manner that the movable section 150 can readily move in the focusing direction Fo, the tracking direction Tr, the radial tilt direction Rt and the tangential tilt direction Tt.

It should be noted that the tilt spring 10 may be replaced with a rod-like elastic supporting element and the bend or twist deformation of the supporting element makes the fixation section 4A of the suspension wire 4 displaced in the tension and compression directions, thereby obtaining the same functions and effects.

Moreover, the form of the fixation section 4A of the suspension wire 4 may be changed so that the above rod-like elastic supporting element and the suspension wires 4 are combined into an integral unit, thereby obtaining the same functions and effects. Furthermore, when the rod-like elastic supporting element and the suspension wires 4 are integrated, the tilt spring 10 effectively becomes unnecessary.

Figure 4A:
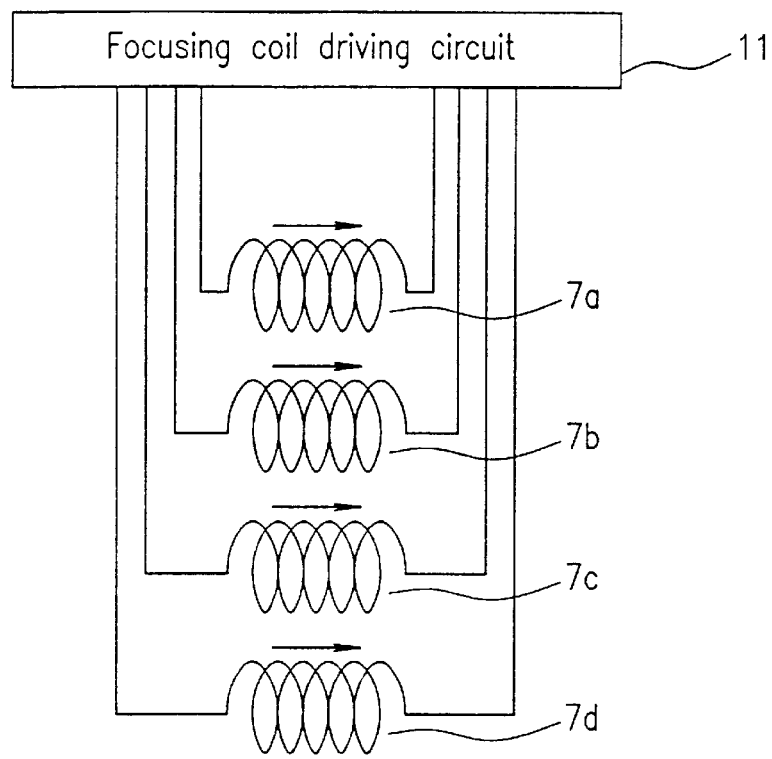
FIG. 4A is a schematic diagram illustrating connections of focusing coils and directions of electric currents for a drive in a focusing direction Fo in Example 4 of the present invention.
Figure 4B:
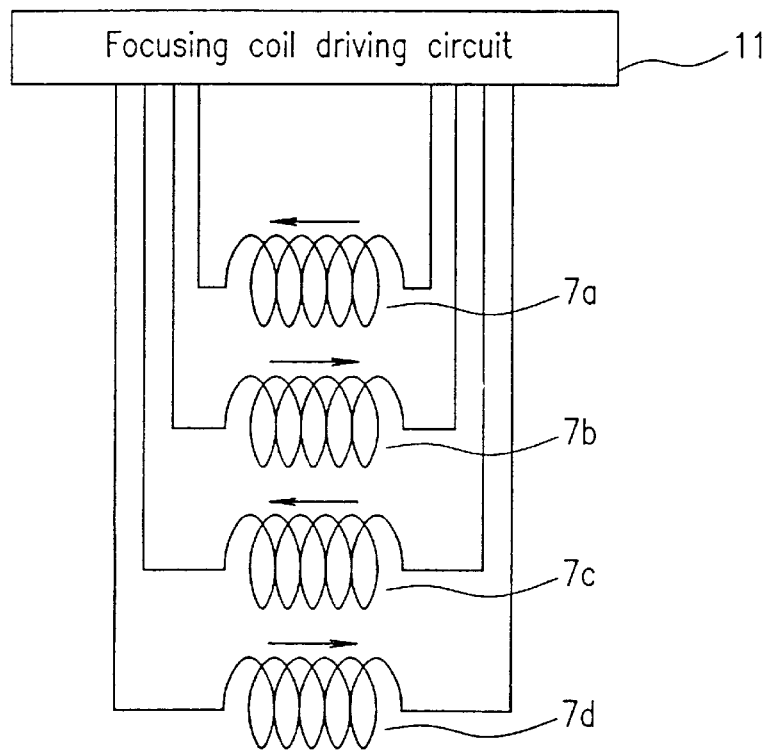
FIG. 4B is a schematic diagram illustrating connections of focusing coils and directions of electric currents for a drive in a radial direction Rt in Example 4 of the present invention.
Figure 4C:
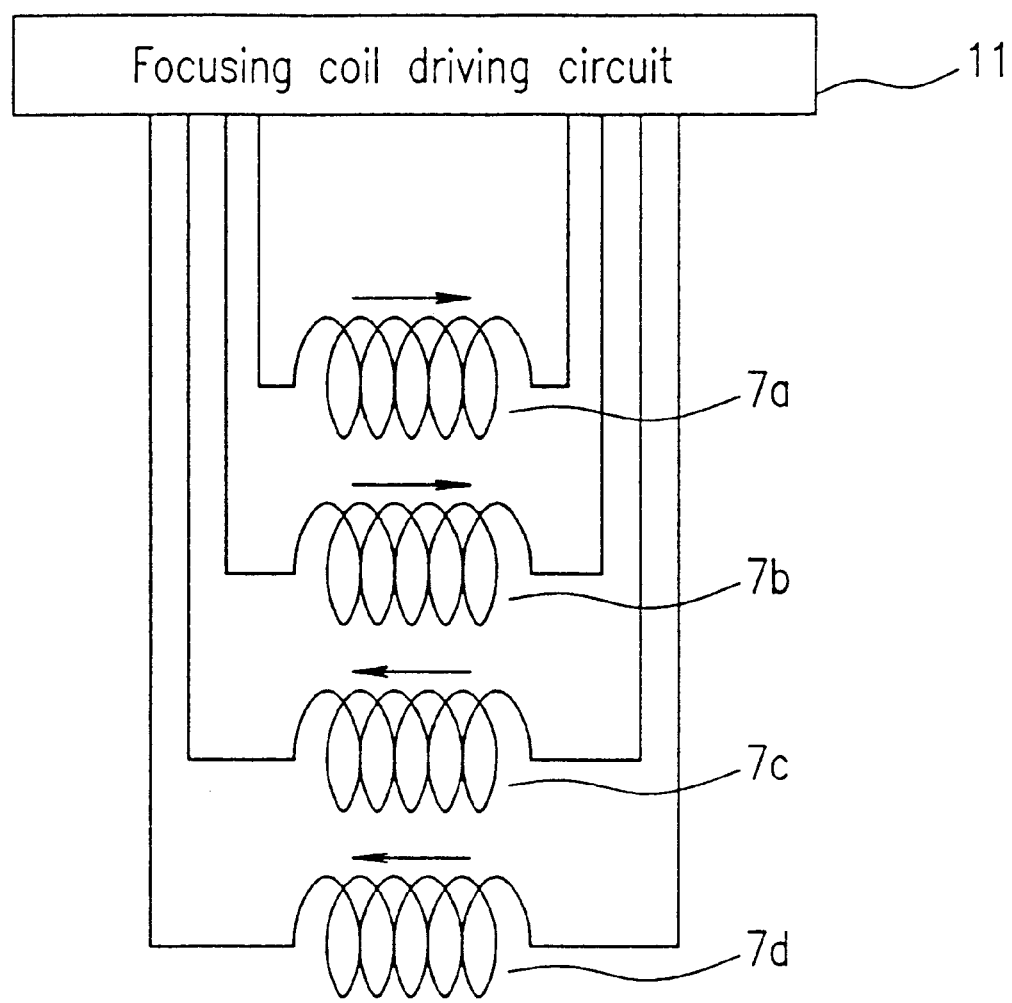
FIG. 4C is a schematic diagram illustrating connections of focusing coils and directions of electric currents for a drive in a tangential direction Tt in Example 4 of the present invention.

FIGS. 4A–4C are schematic diagrams illustrating the directions of electric currents through the focusing coils 7a–7d and the connections between the focusing coils 7a–7d and a focusing coil driving circuit 11. Referring to FIGS. 4A–4C, the focusing coil driving circuit 11 controls the directions and amounts of electric currents through the focusing coils 7a–7d, respectively.

FIG. 4A illustrates directions of electric currents through the focusing coils 7a–7d for driving the movable section 150 toward the focusing direction Fo. FIG. 4B illustrates directions of electric currents through the focusing coils 7a–7d for driving the movable section 150 toward the radial tilt direction Rt. FIG. 4C illustrates directions of electric currents through the focusing coils 7a–7d for driving the movable section 150 toward the tangential tilt direction Tt.

Figure 5A:
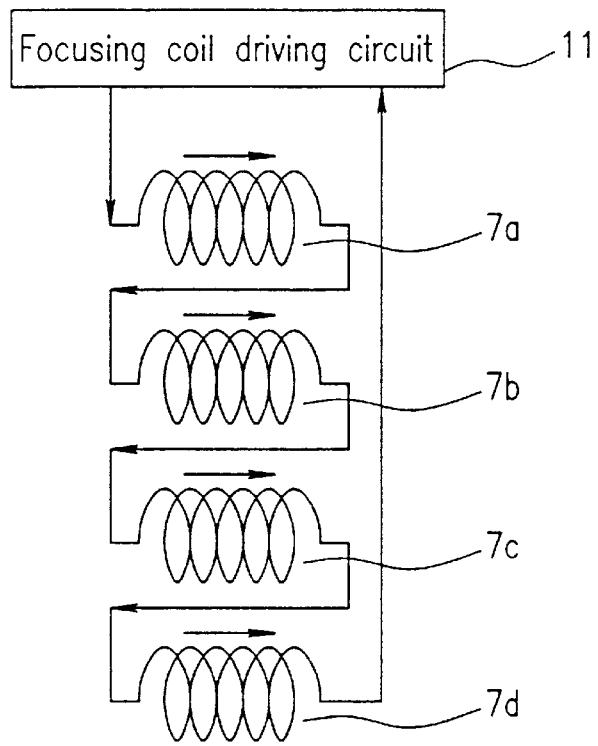
FIG. 5A is a schematic diagram illustrating directions of electric currents for a drive in a focusing direction Fo in Example 4 of the present invention.

The focusing coils 7a–7d and the focusing coil driving circuit 11 are connected as shown in FIGS. 4A–4C. This connection is such that when the movable section 150 is driven toward the focusing direction Fo, electric currents flow through the focusing coils 7a–7d as if the focusing coils 7a–7d are connected as shown in FIG. 5A.

Figure 5B:
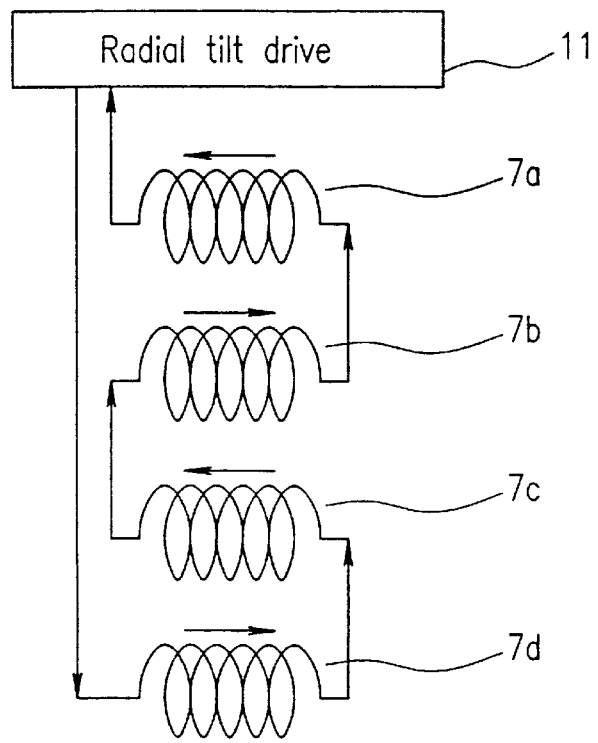
FIG. 5B is a schematic diagram illustrating directions of electric currents for a drive in a radial direction Rt in Example 4 of the present invention.

When the movable section 150 is driven toward the radial tilt direction Rt, electric currents flow through the focusing coils 7a–7d as if the focusing coils 7a–7d are connected as shown in FIG. 5B. The direction of electric currents through the focusing coils 7a and 7c is opposite to that through the focusing coils 7b and 7d.

Figure 5C:
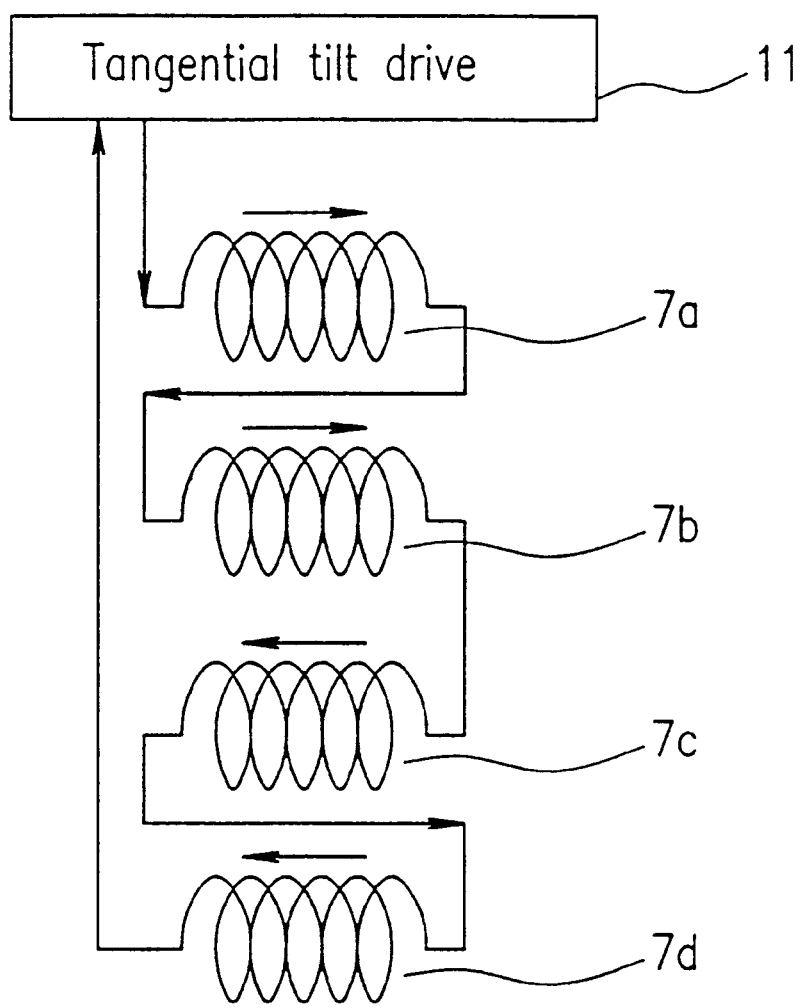
FIG. 5C is a schematic diagram illustrating directions of electric currents for a drive in a tangential direction Tt in Example 4 of the present invention.

When the movable section 150 is driven toward the tangential tilt direction Tt, electric currents flow through the focusing coils 7a–7d as if the focusing coils 7a–7d are connected as shown in FIG. 5C. The direction of electric currents through the focusing coils 7a and 7b is opposite to that through the focusing coils 7c and 7d.

It should be noted that the amounts of driving currents through the focusing coils 7a–7d may be changed based on focusing error signals or tracking error signals, thereby obtaining satisfactory control features.

EXAMPLE 2

Figure 6A:
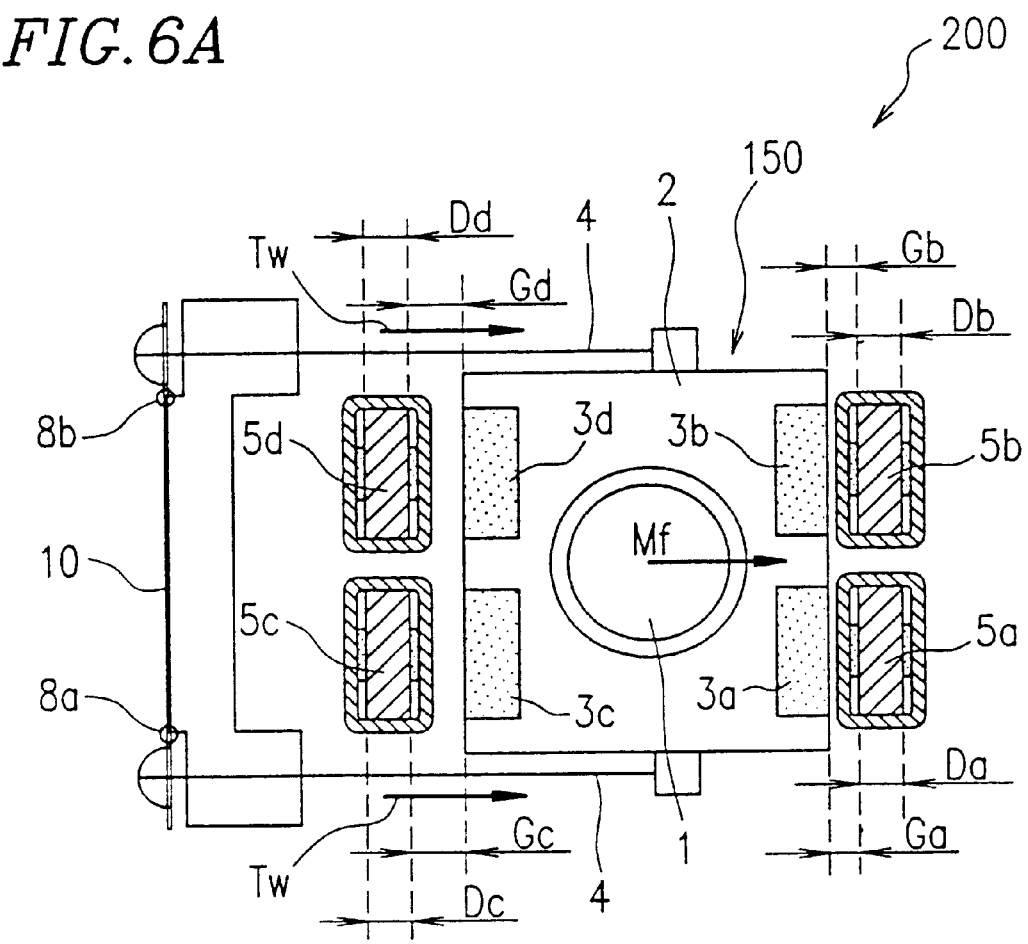
FIG. 6A is a schematic diagram illustrating a structure of an object lens driving device according to Example 2 of the present invention.

FIG. 6A is a schematic diagram illustrating a structure of an object lens driving device 200 according to Example 2 the present invention. In FIG. 6A, reference symbols Ga–Gd indicate gaps between permanent magnets 3a–3d and opposed yokes 5a–5d, respectively; Da–Dd thicknesses of the opposed yokes 5a–5d in the direction of a magnetic field; ±Mf a magnetic force caused by magnetic forces of attraction between the permanent magnets 3a–3d and the opposed yokes 5a–5d, acting on a movable section 150; and Tw a force of tension produced by the above-described magnetic attraction force, acting on suspension wires 4.

Referring to FIG. 6A, the permanent magnets 3a–3d and the opposed yokes 5a–5d are provided in such a relative relationship that Ga<Gc and Gb<Gd. The magnetic attraction force decreases in inverse proportion to the sizes of the gaps Ga–Gd. Accordingly, a magnetic force acts on the movable section 150 toward the direction +Mf, thereby providing a tension along the direction Tw for each suspension wire 4.

As described above, according to Example 2, the deformation, such as buckling, of the suspension wires 4 can be avoided, resulting in consistently stable supporting of the movable section.

It should be noted that the thicknesses Da–Dd may be provided in such a relationship that Da>Dc and Db>Dd, instead of setting the above relationship of the gaps Ga–Gd. The magnetic attraction force increases in proportion to the thickness of the yoke. Therefore, in such a setting, a magnetic force acts on the movable section 150 toward the direction +Mf, thereby providing a tension along the direction Tw for each suspension wire 4. In this case, accordingly, the same functions and effects as described above can be obtained.

EXAMPLE 3

FIG. 6B is a schematic diagram illustrating a structure of an object lens driving apparatus 300 according to Example 3 of the present invention. In FIG. 6B, reference symbols Ua–Ud indicate reaction forces (spring forces) against the respective tensions Tw of the suspension wires 4 acting on each bending section of the a tilt spring 10.

According to Example 3, the spring forces Ua–Ud of the tilt spring 10 are provided so that Ua>Tw, Ub>Tw, Uc>Tw and Ud>Tw. Each of the spring forces Ua–Ud of the tilt spring 10 is set to be less than a spring force in a buckling direction of the suspension wire 4.

As described above, according to Example 3, with the tension Tw provided for stably supporting a movable section as described in Example 2, precision of positioning the movable section can be maintained while the influence of buckling resonance of suspension wires upon the movable section can be reduced.

EXAMPLE 4

Figure 7:
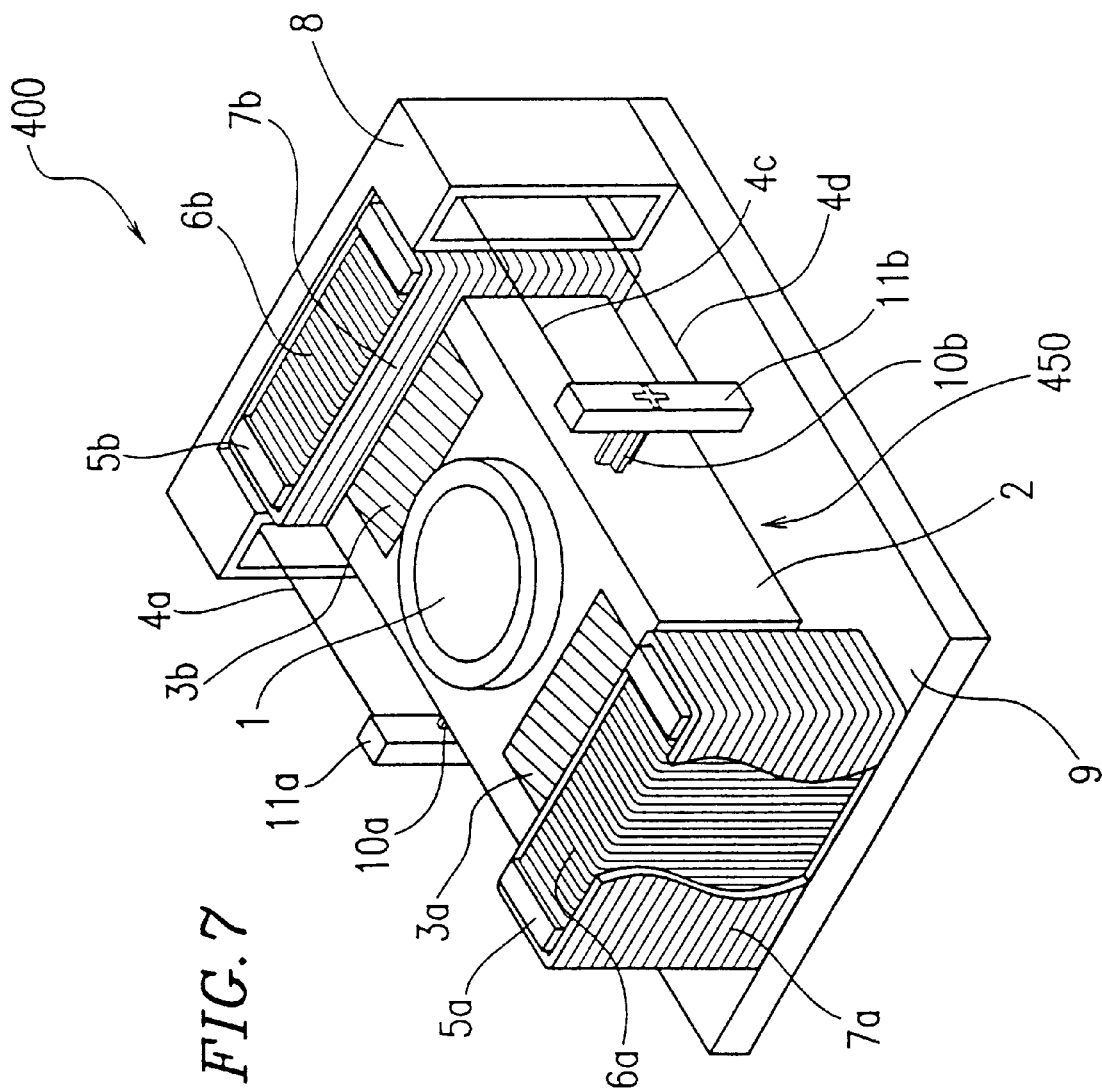
FIG. 7 is a perspective view illustrating a structure of an object lens driving device according to Example 4 of the present invention.
Figure 8:
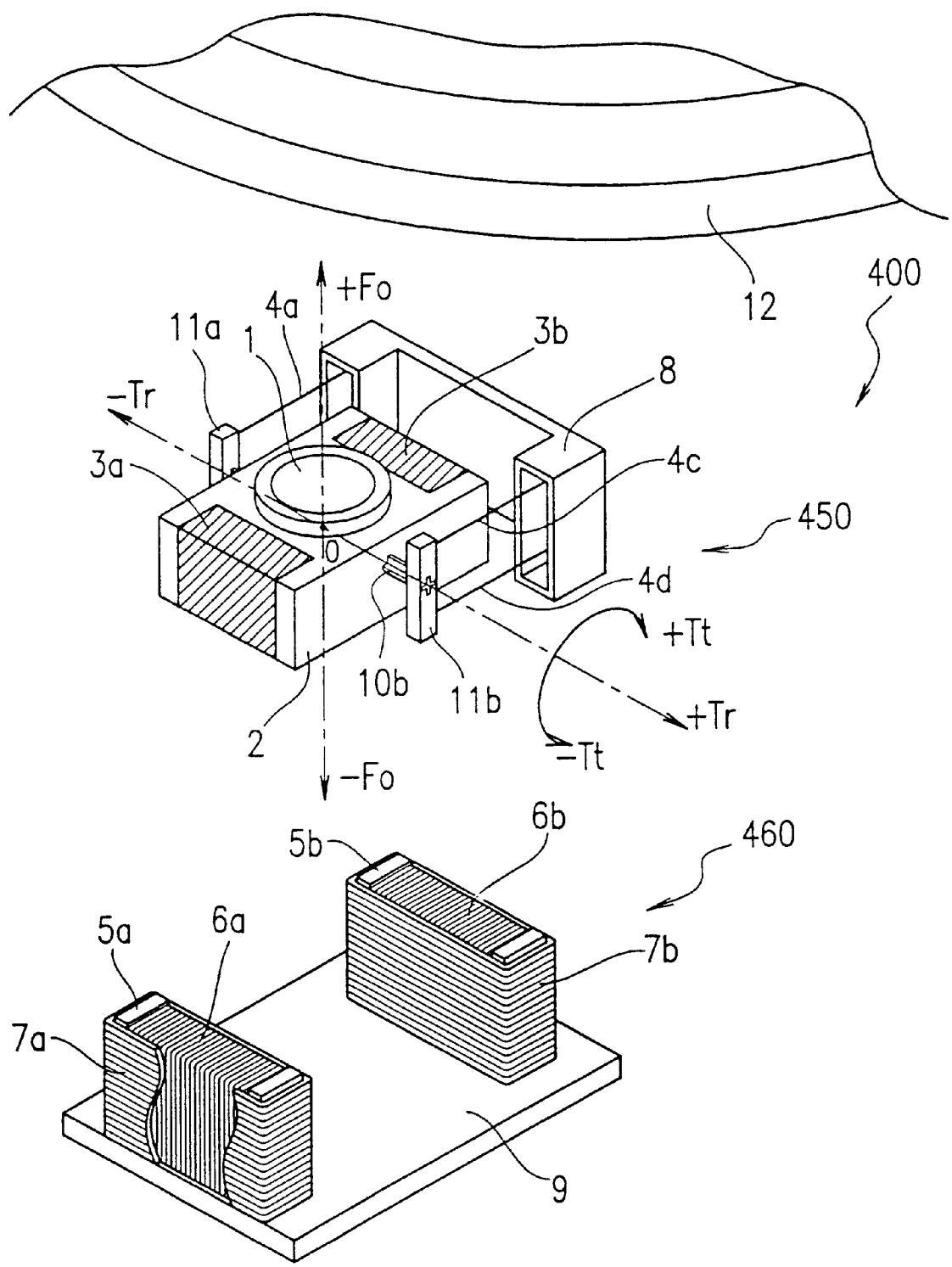
FIG. 8 is an exploded perspective view illustrating a definition of drive directions in Example 4 of the present invention.
Figure 9A:
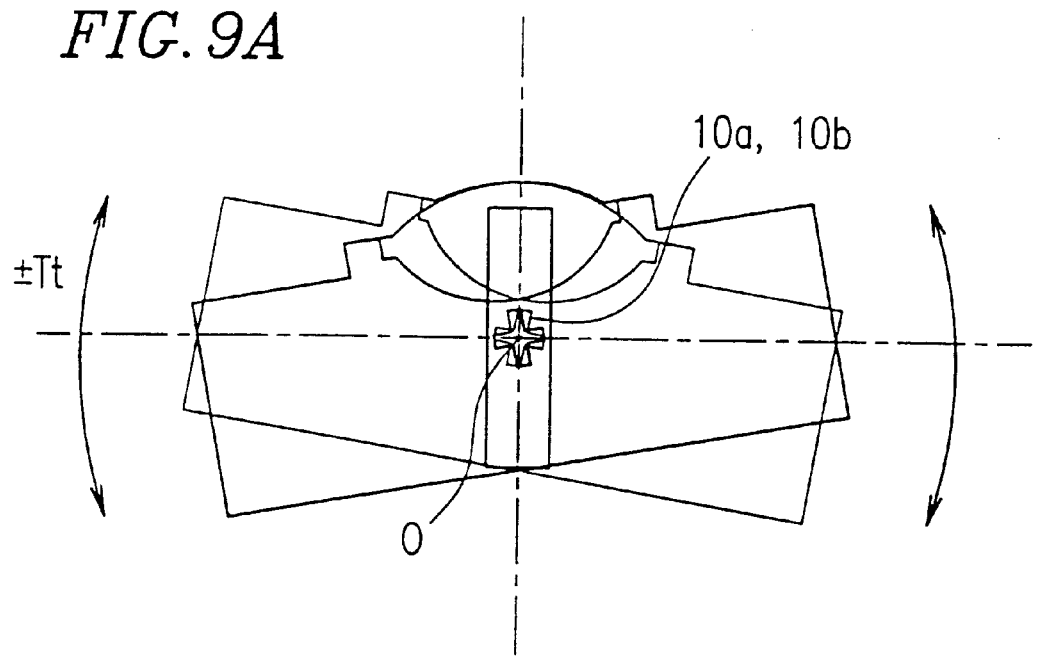
FIG. 9 is an exemplary diagram illustrating rotation around a rotational axis for a tangential drive according to Example 4 of the present invention.
Figure 9B:
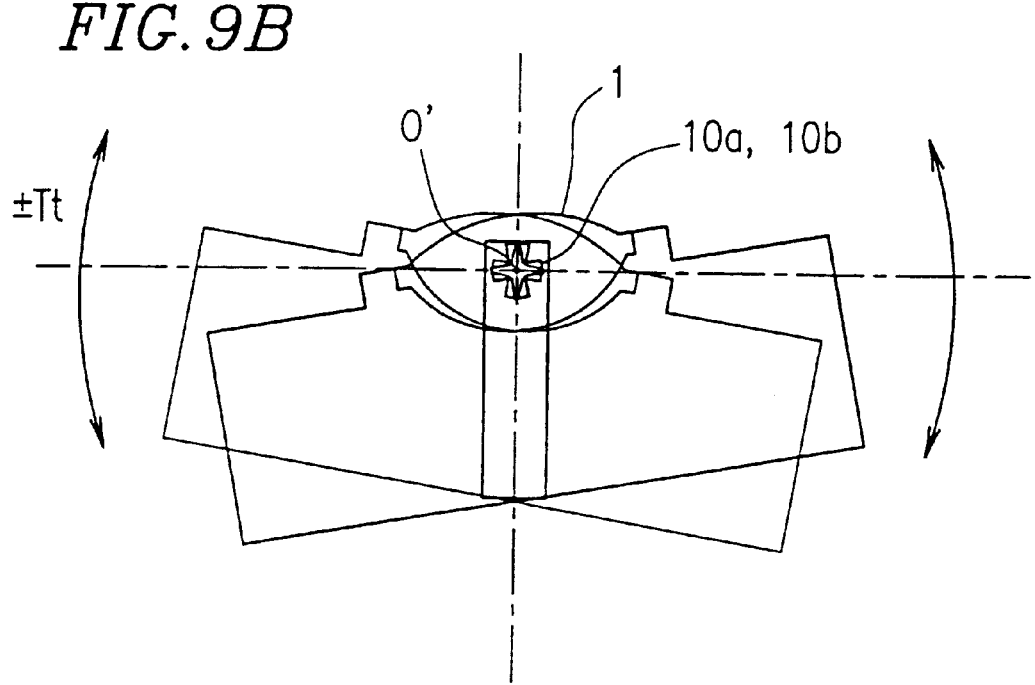

FIG. 7 is a perspective view illustrating an object lens driving device 400 according to Example 4 of the present invention. FIG. 8 is a perspective view, partially exploded, of the object lens driving device 400 for defining driving directions thereof. FIGS. 9A and 9B are exemplary diagrams illustrating pivotal movements of a movable section around a pivotal axis by a tangential drive. The present invention relates to an arrangement for the tangential drive which will be described in Example 4 by presenting an example of an object lens driving device performing a 3-axis drive including a tangential drive, a focusing drive and a tracking drive. The present invention is not limited to this. The present invention can be applied to an object lens driving device performing a 4-axis drive as described in Example 1.

Referring to FIGS. 7 and 8, the device 400 includes an object lens 1, a lens holder 2, permanent magnets 3a and 3b, suspension wires 4a–4d, opposed yokes 5a and 5b, tracking coils 6a and 6b, focusing coils 7a and 7b, a suspension holder 8, a fixation base 9, elastic deformable elements 10a and 10b, and relaying elements 11a and 11b. Reference numeral 12 indicates a disk. Reference symbol O indicates the center of mass of a movable section 450.

Driving directions of the movable section 450 will be defined with reference to FIG. 8. As is defined in FIG. 12, reference symbols ±Fo indicate focusing directions perpendicular to the recording surface of a disk toward which the movable section 450 moves in focusing; ±Tr tracking directions that are radial directions toward which the movable section 450 moves in tracking; and ±Tt tangential tilt directions along a circle of the disk recording surface toward which the movable section tilts.

The object lens 1, the lens holder 2, the permanent magnets 3a and 3b, the elastic deformable elements 10a and 10b, and the relaying elements 11a and 11b constitute the movable section 450, where the permanent magnets 3a and 3b are adhered to the lens holder 2, the relaying elements 11a and 11b are connected to the lens holder 2 via the elastic deformable elements 10a and 10b. The suspension wires 4a–4d each have a first end thereof attached to the suspension holder 8 provided on the fixation base 9 and a second end thereof attached to the relaying elements 11a and 11b, supporting the movable section 450 in such a manner that the displacement of the movable section 450 is adjustable both in the focusing direction and in the tracking direction. The tracking coils 6a and 6b and the focusing coils 7a and 7b are provided around the opposed yokes 5a and 5b, respectively. The opposed yokes 5a and 5b are positioned in a manner to face the permanent magnets 3a and 3b, respectively, and fixed to the fixation base 9.

The elastic deformable elements 10a and 10b interconnect the lens holder 2 and the relaying elements 11a and 11b to which the suspension wires 4a–4d are attached. According to this arrangement, the lens holder 2 is supported in such a manner that the lens holder 2 can pivot around the axes of the elastic deformable elements 10a and 10b, i.e., in the tangential tilt direction ±Tt. Extensions of the pivotal axes of the elastic deformable elements 10a and 10b both pass through the center of mass O of the movable section 450 as shown in FIG. 8.

Next, the driving and controlling of the movable section 450 will be described. The focusing drive is performed by exerting on the permanent magnets 3a and 3b electromagnetic forces generated by the permanent magnets 3a and 3b being influenced by the electromagnetic flux of the focusing coils 7a and 7b through which electric currents flow so that the electromagnetic forces are directed toward the same direction +Fo. In a similar manner, the tracking drive is performed by exerting on the permanent magnets 3a and 3b electromagnetic forces generated by the permanent magnets 3a and 3b being influenced by the electromagnetic flux of the focusing coils 6a and 6b through which electric currents flow so that the electromagnetic forces are directed toward the same direction +Tr. In focusing and tracking of a disk, errors may occur due to fluctuations of the disk such as wobbling and off-center rotation. To correct such errors, an error detecting means (not shown) is provided for detecting the shift of a light beam caused by the fluctuations of the disk and outputting error signals. The focusing and tracking are performed so that the error signal is consistently minimized by servo control using such error signals.

The tangential drive is performed by exerting on the permanent magnets 3a and 3b electromagnetic forces in opposite directions +Fo and –Fo (or –Fo and +Fo), respectively, generated by controlling directions of electric currents through the focusing coils 7a and 7b. The electromagnetic forces in the opposite directions generate the moment of rotation along the direction ±Tt, which forces the movable section 450 to move along the tangential tilt direction. In this case, the pivotal axis is each axis of the elastic deformable elements 10a and 10b. Tangential tilt control is performed by the tangential drive, referring to an error signal from a tilt detecting means (not shown) such as a tilt sensor, so that a tilt is consistently minimized or a time-based error signal (jitters) is consistently optimized. Thus, optical aberration of the object lens 1 caused by the tilt is removed, thereby realizing stable recording and reproduction.

Next, the elastic deformable elements 10a and 10b will be described in detail. The effects thereof will be also described. The elastic deformable elements 10a and 10b are flat springs made of a spring material such as phosphor bronze which are deformable to be twisted. The cross-sections perpendicular to the axis, of the elements 10a and 10b, are L-shaped or +-shaped. The elastic deformable elements 10a and 10b shown in FIG. 7 have +-shaped sections. The elements 10a and 10b are sufficiently flexible in a pivotal direction around the axes thereof while being very rigid in a direction perpendicular to the axes thereof. Therefore, the movable section 450 can pivot around the axes of the elements 10a and 10b, but cannot translationally move in a direction perpendicular to the axes. Thus, unnecessary displacement of the movable section 450 is suppressed, thereby realizing stable movements thereof.

The spring constant along the pivotal direction, of the elastic deformable elements 10a and 10b, can be arbitrarily adjusted by changing the axial length, thickness and shape thereof. By providing an appropriate setting, optimal drive sensitivity can be obtained in a low frequency region of tangential tilt-drive characteristics.

The suspension wires 4a–4d are each attached at a first end thereof to the rigid relaying elements 11a and 11b and at a second end thereof to the rigid suspension holder 8 in such a manner that the suspension wires 4a and 4b and the suspension wires 4c and 4d are, in each pair, parallel to each other and arranged side by side along the focusing direction. Therefore, even when the movable section 450 moves in the focusing direction and the suspension wires 4a–4d bend, the movable section 450 moves while keeping virtual planes, which are defined by the suspension wires 4a and 4b and the suspension wires 4c and 4d respectively, both substantially parallel to the focusing direction. Therefore, the movable section 450 is driven while maintaining a substantially constant attitude thereof.

It should be noted that the twist flat spring constant is determined so that returning forces around the pivotal axes of the elastic deformable elements 10a and 10b are greater than magnetic attraction forces around the axes of the elements 10a and 10b generated between the permanent magnets 3a and 3b and the opposed yokes 5a and 5b fixed on the fixation base 9. Accordingly, under influence of the magnetic attraction forces, the movable section 450 can be driven while maintaining a substantially constant attitude thereof.

Moreover, if the elastic deformable elements 10a and 10b are covered with a damping material such as silicon, the amplitude of the first-order resonant frequency in the tangential drive characteristics can be reduced.

Extensions of the pivotal axes of the elastic deformable elements 10a and 10b both pass through the center of mass of the movable section 450 as shown in FIG. 9A. Therefore, a dynamic balance of the movable section 450 is maintained, thereby obtaining a stable tangential drive.

When extensions of the pivotal axes of the elastic deformable elements 10a and 10b both pass through the principal point O' of the object lens 1 as shown in FIG. 9B, the movable section 450 pivots around O'. Therefore, the amount of the translational movement of the object lens 1, i.e., the movement along the circle of a disk, is reduced, thereby minimizing time-based fluctuations of recording and reproduction signals.

Figure 10:
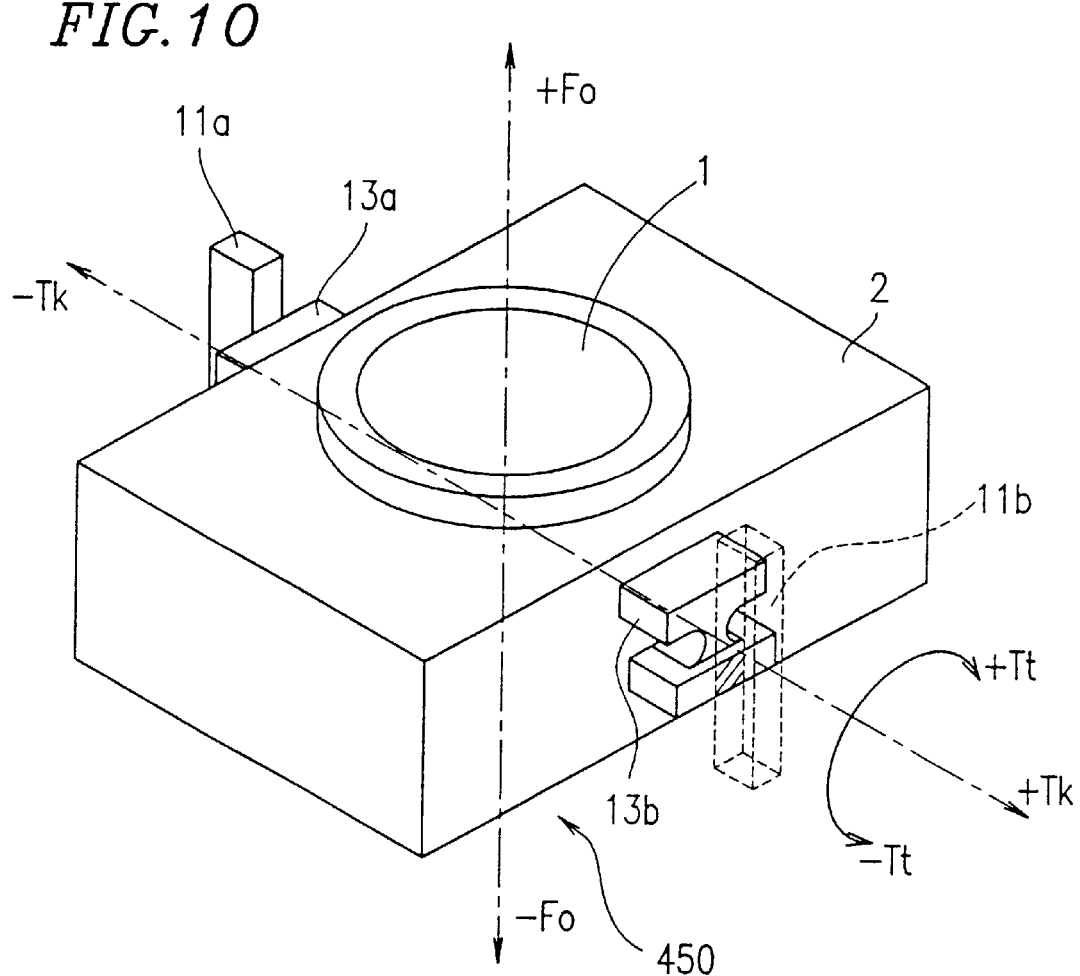
FIG. 10 is a schematic diagram illustrating an object lens driving device employing hinges as elastic deformable elements according to Example 4 of the present invention.
Figure 11:
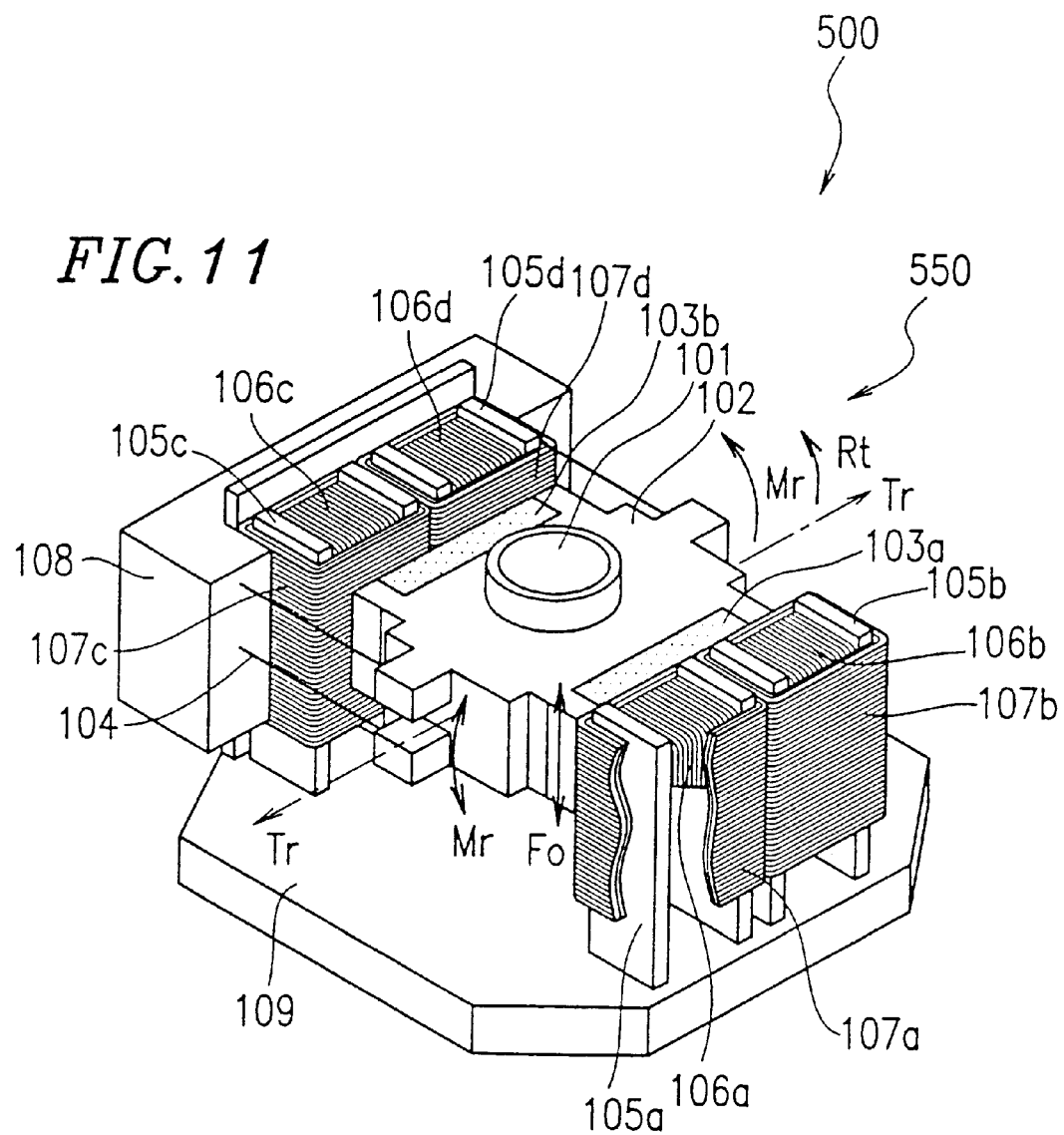
FIG. 11 is a perspective view illustrating a structure of an object lens driving device in the prior art.

Elements 13a and 13b having hinge-like shapes as shown in FIG. 10 may be provided for supporting the movable section 450 in such a manner that the movable section 450 pivots along the direction ±Tt, instead of the elastic deformable elements 10a and 10b. In this case, the same effects can be also obtained. Optimal spring returning forces of the hinge-like elements 13a and 13b along the pivotal direction thereof are provided by adjusting the material, the shape and the thickness of the hinge-like elements 13a and 13b. If the hinge-like elements 13a and 13b and the relaying elements 11a and 11b are combined into an integral unit, the number of parts is decreased, thereby reducing cost.

In Example 4, for the simplification of description, an exemplary object lens driving device is described that performs 3-axis drive including a focusing drive, a tracking drive and a tangential drive. An object lens driving device capable of an additional radial drive may be used where two permanent magnets and two focusing coils are provided side by side along a tracking drive axis like as the permanent magnets 3a and 3b and the focusing coils 7a and 7b described above.

As described above, according to the present invention, driving means for focusing that are deployed at the four positions and a tilt spring for supporting fixation sections of suspension wires so that the fixation sections can be displaced in tension and compression directions are provided, whereby a movable section can be driven and supported in such a manner that the movable section can readily move in four axial directions, i.e., a focusing direction, a tracking direction, a radial tilt direction and a tangential tilt direction.

According to the present invention, permanent magnets adhered to a movable section and opposed yokes fixed on a fixation base produce magnetic attraction forces which act on suspension wires in a tension direction, whereby deformation such as buckling can be avoided, resulting in consistently stable supporting of the movable section.

According to the present invention, a spring force of a tilt spring is provided so as to be sufficiently greater than a tension of a suspension wire and less than a spring force in a buckling direction of the suspension wire, whereby precision of positioning the movable section can be maintained while influence of buckling resonance of the suspension wire upon the movable section is reduced.

According to the present invention, a first end of a suspension wire is fixed to a relaying element and the relaying element is connected to a lens holder via an elastic deformable material in such a manner that a movable section including the lens holder can pivot, whereby it is possible to provide an arbitrary first-order resonant frequency and suitable drive sensitivity for a tangential drive.

According to the present invention, even when a movable section moves toward a focusing direction, a translational movement of the movable section in a direction of the axis of a suspension wire does not occur, whereby the attitude of the movable section is maintained, resulting in a stable tangential drive.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An object lens driving device, comprising:
 a movable section;
 supporting sections for supporting the movable section; and
 a base for holding the supporting sections,
 the movable section comprising:
  an object lens for recording and/or reproducing optical information to and/or from a disk-shaped recording medium:
  a lens holder for holding the object lens; and
  at least four permanent magnets adhered to the lens holder, the supporting sections comprising:
at least four metal wires substantially parallel to each other, each wire having a first end fixed to the lens holder and a second end connected to the base; and
elastic deformable elements connected to the base and having connecting sections thereof connected to the second end of each respective metal wire, and
the base comprising:
yokes fixed to the base and facing the respective permanent magnets;
focusing coils wound around the respective yokes, wound axes of the focusing coils being oriented in a direction of an optical axis of the object lens; and
tracking coils wound around the respective yokes, wound axes of the tracking coils being oriented in a direction perpendicular to the wound axes of the focusing coils.

2. An object lens driving device according to claim 1, further comprising a control section for applying electric currents to the respective focusing coils, wherein
the control section switches directions of the electric currents to drive the lens holder in a focusing direction, a radial tilt direction and a tangential tilt direction.

3. An object lens driving device according to claim 1, wherein
the elastic deformable elements are board-shaped or rod-shaped; and
the connecting sections are elastic-deformable so that the second end of each respective metal wire can displace along an axial direction of the metal wire.

4. An object lens driving device according to claim 1, wherein
the yokes are provided to face the respective permanent magnets along the axial direction of the metal wire;
the yokes and the permanent magnets are provided so that forces of tension act on the metal wires; and
the forces of tension are generated by the addition of magnetic forces of attraction between the yokes and the permanent magnets.

5. An object lens driving device according to claim 4, wherein distances between the yokes and the permanent magnets are provided so that forces of tension act on the metal wires.

6. An object lens driving device according to claim 4, wherein thicknesses of the yokes along the axial direction of the metal wire are provided so that forces of tension act on the metal wires.

7. An object lens driving device according to claim 4, wherein spring forces necessary for the connecting sections to deform along axial directions of the respective metal wires are greater than at least the respective magnetic forces of attraction.

8. An object lens driving device according to claim 1, wherein the lens holder comprises:
relaying elements, the first end of the metal wire being connected to each relaying element;
a main body of the lens holder for holding the object lens; and
elastic deformable elements for interconnecting the main body of the lens holder and the relaying elements, deforming so that the main body of the lens holder pivots in a tangential tilt direction.

9. An object lens driving device, comprising:
a movable section;
supporting sections for supporting the movable section; and
a base for holding the supporting sections,
the movable section comprising:
an object lens for recording and/or reproducing optical information to and/or from a disk-shaped recording medium;
a lens holder for holding the object lens; and
at least two permanent magnets adhered to the lens holder,
the supporting sections comprising:
at least four metal wires substantially parallel to each other, each wire having a first end fixed to the lens holder and a second end connected to the base,
the base comprising:
yokes fixed to the base and facing the respective permanent magnets;
focusing coils wound around the respective yokes, wound axes of the focusing coils being oriented in a direction of an optical axis of the object lens; and
tracking coils wound around the respective yokes, wound axes of the tracking coils being oriented in a direction perpendicular to the wound axes of the focusing coils, and
the lens holder comprising:
relaying elements, the first end of the metal wire being connected to each relaying element;
a main body of the lens holder for holding the object lens; and
elastic deformable elements for interconnecting the main body of the lens holder and the relaying elements, deforming so that the main body of the lens holder pivots in a tangential tilt direction.

10. An object lens driving device according to claim 9, wherein the elastic deformable element comprises a flat spring that has a pivotal axis and deforms by twisting around the pivotal axis so that the main body of the lens holder pivots in a tangential tilt direction, the flat spring having L-shaped or +-shaped cross-section thereof.

11. An object lens driving device according to claim 9, wherein the elastic deformable element is hinge-shaped.

12. An object lens driving device according to claim 9, wherein the elastic deformable element has a pivotal axis and deforms by twisting around the pivotal axis so that the main body of the lens holder pivots in a tangential tilt direction, and
the elastic deformable element is provided so that the pivotal axis passes through a center of mass of the movable section.

13. An object lens driving device according to claim 9, wherein the elastic deformable element has a pivotal axis and deforms by twisting around a pivotal axis so that the main body of the lens holder pivots in a tangential tilt direction, and
the elastic deformable element is provided so that the pivotal axis passes through a principal point of the object lens.

14. An object lens driving device according to claim 9, wherein the elastic deformable element comprises a flat spring that has a pivotal axis and deforms by twisting around the pivotal axis so that the main body of the lens holder pivots in a tangential tilt direction, and the flat spring is covered with a damping material.

15. An object lens driving device according to claim 9, wherein a returning force generated by a pivotal movement of the elastic deformable element is greater than at least a magnetic force of attraction around the pivotal axis generated between the yoke and the permanent magnet.

* * * * *